United States Patent
Jadir Mendes Ferreira et al.

(10) Patent No.: US 11,214,140 B2
(45) Date of Patent: Jan. 4, 2022

(54) FUEL TANK WITH INTEGRATED LEVEL SENSORS, IN PARTICULAR FOR AERIAL VEHICLES

(71) Applicants: STRATOSPHERE, S.A., Guimarães (PT); CEIIA—CENTRO DE ENGENHARIA E DESENVOLVIMENTO (ASSOCIAÇÃO), Matosinhos (PT); CENTITVC—CENTRO DE NANOTECNOLOGIA E MATERIAIS TÉCNICOS, FUNCIONAIS E INTELIGENTES, Vila Nova de Famalicão (PT)

(72) Inventors: Nelson Jadir Mendes Ferreira, São Mamede Este (PT); Joaquim Miguel Fonseca Silva, Guimarães (PT); Christophe Da Silva Fernandes, Brunhais (PT); Pedro Dos Santos Duarte Carvalho, Viana do Castelo (PT); João Manuel De Carvalho Gomes, Braga (PT); Miguel Bruno Vieira Ribeiro, Alvarelhos Trf (PT); Bruno Guiherme Gonçalves De Matos, Lousada (PT); Ana Rita Bento Montes, Portimão (PT); André Lourenço Caldeira Pinto, Arcos de Valdevez (PT); Pedro Miguel Gonçalves Da Costa Pereira, Viana do Castelo (PT); José Manuel Gusman Correia Araujo Barbosa, Braga (PT)

(73) Assignees: STRATOSPHERE, S.A., Guimarães (PT); CENTITVC—CENTRO DE NANOTECNOLOGIA E MATERIAIS TÉCNICOS, FUNCIONAIS E INTELIGENTES, Vila Nova de Famalicão (PT); CEIIA—CENTRO DE ENGENHARIA E DESENVOLVIMENTO (ASSOCIAÇÃO), Matosinhos (PT)

( * ) Notice: Subject to any disclaimer, the term of this patent is extended or adjusted under 35 U.S.C. 154(b) by 127 days.

(21) Appl. No.: 16/620,726

(22) PCT Filed: Jun. 7, 2018

(86) PCT No.: PCT/IB2018/054124
§ 371 (c)(1),
(2) Date: Dec. 9, 2019

(87) PCT Pub. No.: WO2018/225010
PCT Pub. Date: Dec. 13, 2018

(65) Prior Publication Data
US 2020/0189383 A1    Jun. 18, 2020

(30) Foreign Application Priority Data

Jun. 7, 2017    (PT) .......................................... 110127

(51) Int. Cl.
*B60K 15/03*    (2006.01)
*F02M 37/00*    (2006.01)
*G01F 23/26*    (2006.01)

(52) U.S. Cl.
CPC ......... *B60K 15/03* (2013.01); *F02M 37/0011* (2013.01); *F02M 37/0082* (2013.01);
(Continued)

(58) Field of Classification Search
CPC ............ Y10T 137/8342; G01F 23/263; G01F 23/268; B60K 15/03; B60K 2015/03223;
(Continued)

(56) References Cited

U.S. PATENT DOCUMENTS 3,377,861 A    4/1968 Thaler et al.
3,830,090 A *  8/1974 Hersch .................. G01F 23/266
                                                     73/304 C
(Continued)

FOREIGN PATENT DOCUMENTS

EP    1722203 A2    11/2006

*Primary Examiner* — Atif H Chaudry
(74) *Attorney, Agent, or Firm* — Leason Ellis LLP

(57) ABSTRACT

Liquid fuel tank comprising a plurality of liquid level detection capacitive sensors, each arranged along an edge of (Continued)

the fuel tank such that the capacitance of said sensors varies with the volume of fuel present in the fuel tank, wherein an independent liquid level detection capacitive sensor is arranged along each edge of the fuel tank bottom and of the side walls; wherein the tank is electrically conductive and each level sensor comprises an electrically insulating plate arranged thickness-wise between sensor and tank, such that tank and sensors are capacitively uncoupled. Method for obtaining the fuel volume comprising: obtaining the reading of the liquid level detection capacitive sensors arranged on the edges of the tank; calculating the volume, corresponding to the fuel, of the geometric solid defined by the fuel tank and by the upper surface of the fuel as defined by the liquid level readings from the sensors.

20 Claims, 8 Drawing Sheets

(52) U.S. Cl.
CPC .. *G01F 23/263* (2013.01); *B60K 2015/03223* (2013.01); *Y10T 137/8342* (2015.04)

(58) Field of Classification Search
CPC ..... B60K 2015/03217; F02M 37/0011; F02M 37/0082; B60Y 2200/51; B60Y 2200/50; B64D 37/02
See application file for complete search history.

(56) References Cited

U.S. PATENT DOCUMENTS

| | | |
|---|---|---|
| 8,966,973 B1 | 3/2015 | Milone |
| 2007/0157718 A1* | 7/2007 | Woodard .............. G01F 23/268 73/149 |
| 2008/0134779 A1 | 6/2008 | Tung et al. |
| 2009/0234597 A1* | 9/2009 | Wilby .................. G01F 23/268 702/55 |
| 2018/0299312 A1* | 10/2018 | Olson .................... G01C 9/005 |

* cited by examiner

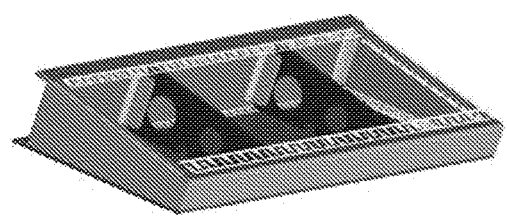
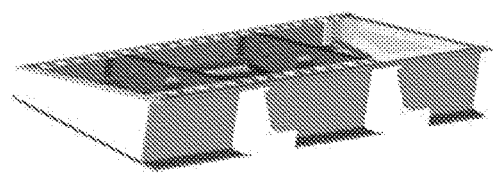
Fig. 3A                    Fig. 3B
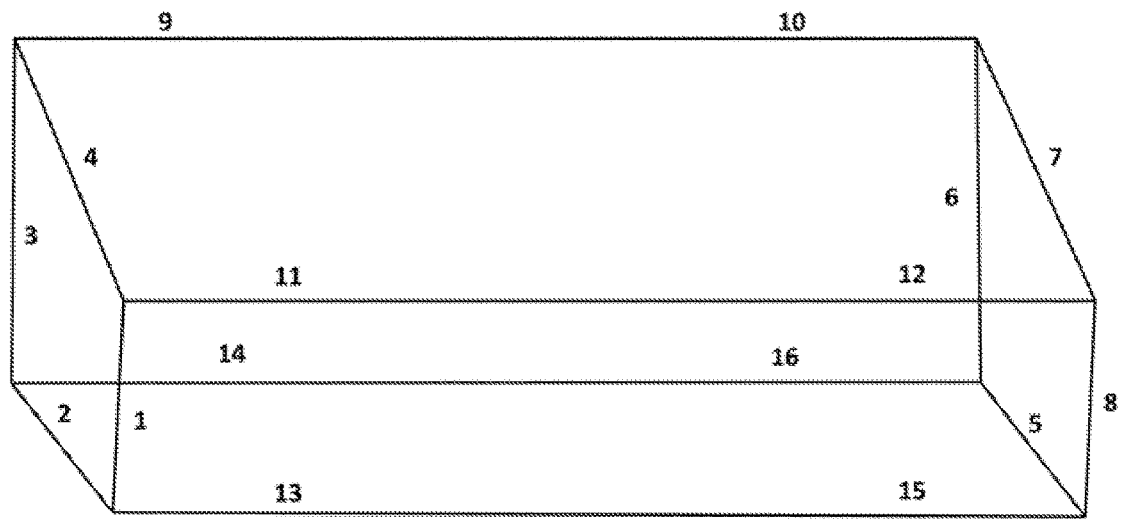
Fig. 4
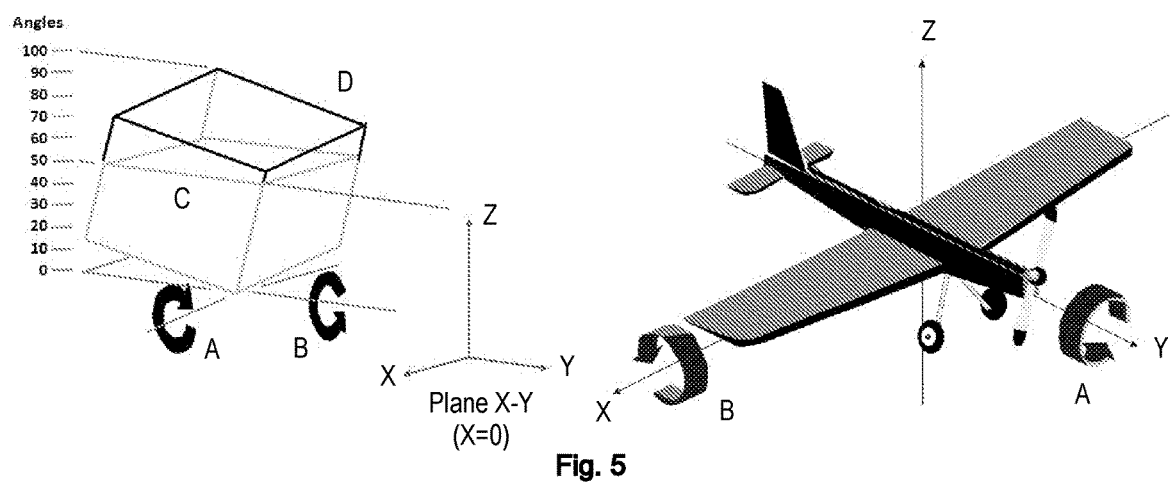
Fig. 5

FUEL TANK WITH INTEGRATED LEVEL SENSORS, IN PARTICULAR FOR AERIAL VEHICLES

CROSS-REFERENCE TO RELATED APPLICATIONS

This application is a U.S. National Stage Application under 35 U. S.C. § 371 of International Patent Application No. PCT/IB2018/054124, filed Jun. 7, 2018 which claims priority to Portugal Patent Application No. 110127, filed Jun. 7, 2017, the contents of which are each hereby incorporated by reference in their respective entireties.

TECHNICAL DOMAIN

The present description relates to a fuel tank, in particular an aircraft fuel tank, in particular in composite material, using integrated or embedded sensing for reading the amount of existing fuel.

BACKGROUND

US2015274005 discloses a fuel tank including: a fuel tank; a liquid level detection sensor arranged in a vertical orientation inside the fuel tank and configured such that a capacitance of the liquid level detection sensor varies depending on a range where the fuel is in contact with the liquid level detection sensor; a tubular element extending vertically and laterally about the liquid level detection sensor; a fuel storage member communicating with the interior of the tubular member and the interior of the fuel tank by a fuel inlet/outlet port, and configured to store the fuel inside the fuel tank.

US2015274005 is not suitable for use in vehicles, in particular in air vehicles, because it cannot accurately measure the fuel volume when the tank is not perfectly horizontal, and does not take the possibility of the liquid oscillating due to the movement of the vehicle into account.

GB752699A discloses a fuel tank with measurement of the fluid content of an irregular vessel, by the use of a condenser, having the fluid as its dielectric, and having an electrode in such a shape that the level of the contact surface of the electrode with the fluid is proportional to the surface area of the fluid at that level, and wherein a linear relationship is obtained between the capacity and amount of fluid. The metering condenser comprises vertical and coaxial cylindrical members and is covered with a conductive material, but with openings to allow fluid to pass into the space between the members and its interior, which has a profiled conductive layer on a rigid insulation member. In its circuit, the voltage measured in the condenser is compared with a reference, any voltage unbalance being amplified and fed to a servomotor, thus balancing the reference and adjusting the voltage between the reference arms, and also by triggering an indicator, indicating the fluid content of the tank.

GB752699A is not suitable for use in vehicles, in particular in air vehicles, because it does not accurately measure the fuel volume when the tank is not perfectly horizontal, and does not take into account the possibility of the liquid oscillating due to the movement of the vehicle.

These facts are described in order to illustrate the technical problem solved by the embodiments of the present document.

GENERAL DESCRIPTION

The present disclosure comprises an aircraft fuel tank, in composite material, using integrated or embedded sensing for reading the amount of existing fuel.

The present disclosure arises from the need for weight reduction, a critical factor in aeronautical structures and also the precise determination of the fuel level.

The present disclosure comprises the use of different designs of sensors embedded in composite laminates with materials of different compositions. Various laminating sequences and orientations of composite fibres, as well as different materials and variation in the order of stacking of the materials are possible. In order to integrate sensors into carbon fibre composite components, such as an aircraft tank, laminates are described comprising stacking epoxy-embedded fibreglass layers. Considering the difficulty of integrating a sensor directly into the carbon fibre composite, a monolithic fibre composite, e.g. fibreglass, Kevlar fibre, beryllium fibre, boron fibre, asbestos, and/or natural fibre (e.g. cotton, jute, sisal, linen, and/or hemp) composite plate was used in an embodiment, allowing the production of plates tailored to the sensor to be installed without affecting the production of the constituent component of the fuel tank structure.

It is disclosed a substantially polyhedral liquid fuel tank comprising:
  a plurality of liquid level detection capacitive sensors, each arranged along an edge of the fuel tank such that the capacitance of said sensors varies with the volume of fuel present in the fuel tank.

It is disclosed a liquid fuel tank comprising:
  a plurality of liquid level detection capacitive sensors, each arranged along an edge of the fuel tank such that the capacitance of said sensors varies with the volume of fuel present in the fuel tank, wherein an independent liquid level detection capacitive sensor is arranged along each edge of the fuel tank bottom and side walls. By measuring lateral and bottom edges, the level can be determined even if the fuel tank is nearly empty.

In an embodiment, an independent liquid level detection capacitive sensor is arranged along each edge of the fuel tank. By measuring all edges, the level can be determined even if the fuel tank is nearly empty, nearly full, upside down or not.

In an embodiment, the fuel tank is electrically conductive and each liquid level detection capacitive sensor comprises an electrically insulating plate each arranged thickness-wise between each capacitive sensor and the fuel tank, the thickness of said plate being such that the fuel tank and the capacitive sensors are capacitively uncoupled for liquid level detection. This has the advantage of allowing a measure without the conductive tank preventing the capacitive measurements.

In an embodiment, said plate is at least 1.5 mm thick, in particular at least 1.8 mm thick, further in particular at least 2 mm thick, or 1.5 mm-50 mm thick, in particular 1.8 mm-25 mm thick, further in particular 2 mm-5 mm thick or 1.5 mm-3 mm. These thicknesses have the advantage of allowing a measure without the conductive tank preventing the capacitive measurements In an embodiment, the capacitive sensors are embedded in the respective electrically insulating plate, the thickness of said plate, between the embedded sensor and the fuel tank, being such that the fuel tank and the capacitive sensors are capacitively uncoupled for liquid level detection. This has the advantages of being a practical way of reducing weight and giving protection to the sensors.

In an embodiment, the insulating plates are embedded into the fuel tank, the fuel tank being of composite material, in particular embedded by autoclave composite curing or by out-of-autoclave composite manufacturing. This has the advantages of being a practical way of reducing weight and part count, and giving protection to the sensors, being a very compact robust construction.

In an embodiment, the insulating plates are of fibre composite, more particularly made of fibreglass, Kevlar fibre, beryllium fibre, boron fibre, asbestos, and/or natural fibre composite, the natural fibre being in particular cotton, jute, sisal, linen, and/or hemp. These fibres are particularly suited to this purpose.

In an embodiment, the fuel tank is substantially polyhedral.

In an embodiment, a liquid level detection capacitive sensor is arranged along each edge of the fuel tank.

Throughout the description and claims the word "comprising" and variations thereof, are not intended to exclude other technical features, components, or steps. Additional objects, advantages and features of the disclosure will become apparent to those skilled in the art upon examination of the description, or may be learned by practice of the disclosure. The following examples and drawings are provided by way of illustration and should not be seen as limiting the scope of the disclosure. Furthermore, the present disclosure covers all combinations of particular or preferred embodiments herein described.

BRIEF DESCRIPTION OF THE FIGURES

The following figures provide preferred embodiments for illustrating the description and should not be seen as limiting the scope of the disclosure.

FIGS. 3A-B: Schematic representation of an embodiment of the geometric arrangement of the sensors in the fuel tank.

FIG. 4: Schematic representation of an embodiment of the tank with numbering identification of the sensors.

FIG. 5: Schematic representation of the roll and pitch nomenclature.

DETAILED DESCRIPTION

Figure 1:
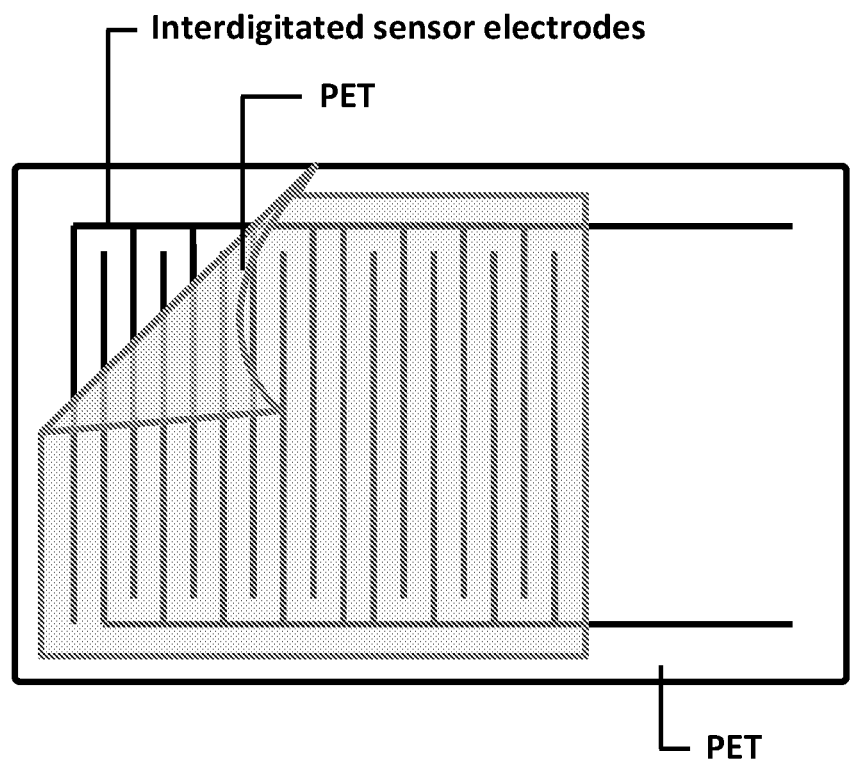
FIG. 1: Schematic representation of an embodiment of the scheme of an embodiment of an interdigitated sensor.
Figure 2:
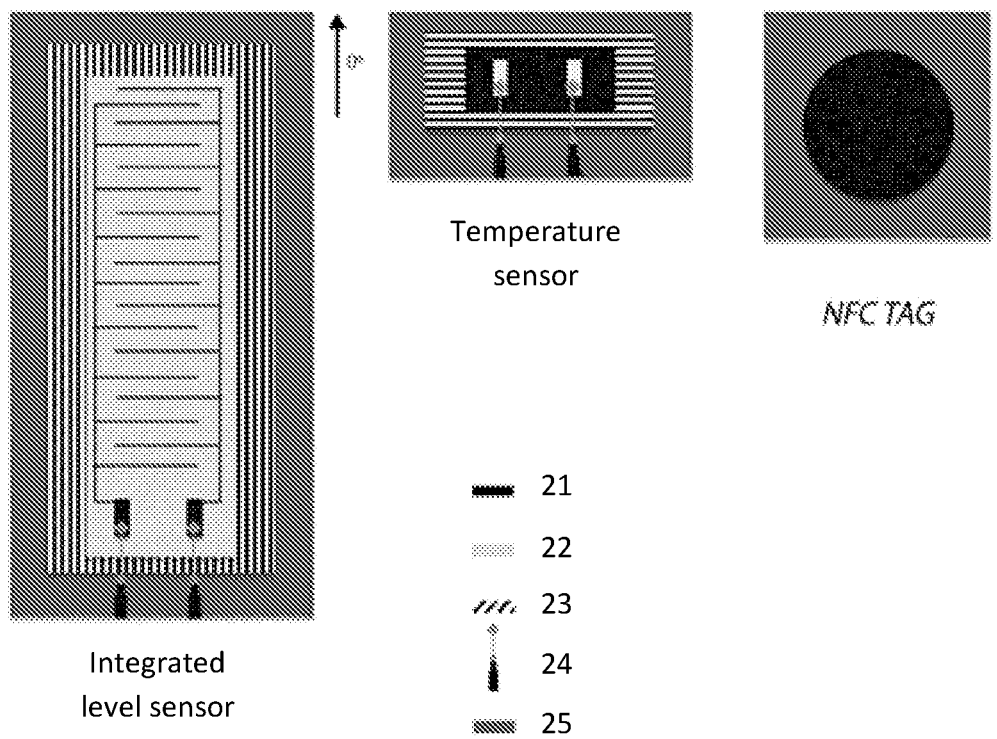
FIG. 2: Schematic representation of an embodiment of the design schematic of the integrated sensors, namely in monolithic fibreglass plate or laminate wherein 21 represents sensor (level, temperature, NFC TAG), 22 represents PET substrate of the level sensor, 23 represents fibreglass laminate, 24 represents sensor cable (level, temperature) and 25 represents carbon fibre composite component.
Figure 6:
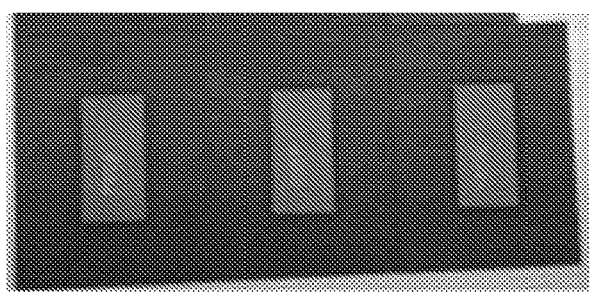
FIG. 6: Schematic representation of an embodiment of the fibreglass composite test specimen (yellow centre) on the carbon fibre composite surface.

In an embodiment the capacitive sensors used are interdigitated since they have high sensitivity and allow, by varying their dimensions, adjusting the measured capacitance values. For the construction of the printed capacitive sensors, different techniques can be used, wherein in the course of the task the screen printing technique was used for printing conductive material electrodes, in this case silver, on the desired substrate. In an embodiment, sensors were printed on PET for geometry definition assays.

In an embodiment, the construction of the sensors may follow the following steps:
1. Printing of the electrodes by screen printing equipment, with silver ink under the PET substrate.
2. Curing the ink at 130° C. for 15 minutes.
3. Encapsulating the sensor with another PET sheet with a thermal adhesive that glues the two PET sheets after laminating, whereupon the sensor is protected.
4. Cutting-out the sensors according to the required dimensions (with a 0.2 to 2 mm margin).
5. Contacts are made by, e.g., crimping, and cables suitable for handling thereof at higher temperatures are welded. Cables are protected by shielding.

In an embodiment, the geometric distribution of the tank level sensors is one of the major factors determining the accuracy of the fuel quantity measurement system. In order to define a distribution of level sensors printed inside the tank allowing the permanent sensing of the fuel level, for different aircraft attitudes, different approaches were analysed.

Considering a distribution combining system redundancy with the ability to measure the fuel level for different attitudes, minimizing the number of sensors required, a structure based on the principle of sensing all tank edges has been developed. This option is based on the consideration that the volume of any geometric solid can be calculated from the length of its edges. Such length can be obtained from the output signal from each of the interdigitated sensors. Given the selected geometry, in an embodiment, sixteen independently operating sensors are required for sensing all edges of the tank model in question, as can be seen in the scheme shown in FIG. 3 and FIG. 4.

In an embodiment, the distribution considered for the sensors makes the system redundant when combined with the aircraft attitude data, information that can be obtained from independent instrumentation, allowing the improvement of the strength and accuracy of the measurements made. This distribution also has the advantage of, for example, for attitudes in which the pitch or roll angles of the aircraft are zero, there are always fully submerged sensors, thus allowing the measurement of the dielectric constant of the fuel to be used in the calibration of the system. In other situations, it is not necessary for the aircraft's pitch or roll angles to be both zero, with only one sensor being fully submerged to gauge the measurement. This measurement of the dielectric constant gives the indication of the type of fuel being used. FIG. 4 shows the numbering of the sensors. The determination that a sensor is submerged can be made from the own capacitance data obtained by reading the sensors, disregarding the use of the attitude data of the aircraft.

In an embodiment, the compatibility of the various sensors and the structure of the tank, in particular with respect to the structural ribs, leads to the existence of maximum and minimum fuel volumes above which sensing is not possible. This limitation is somewhat inherent to the fuel tanks currently used, since under normal operating conditions these are always with a residual fuel level that is not sensed or used.

In an embodiment, in view of the use of this arrangement of the sensors, it was necessary to find a method for calculating the volume that would allow, from the capacities obtained at each sensor, determining the fuel volume for the different attitudes of the aircraft. Calculating the volume of the irregular polygon can be done by breaking down the polygon into pyramids that share a common point (located inside or on the surface of the polygon). Adding the volumes of these pyramids we can calculate the volume of the original polygon. It is necessary to identify the coordinates of the vertices and identify the vertices present on each face.

In an embodiment, the outputs from each sensor can, according to the geometry and position of the sensor, as well as the geometry of the tank, be converted into the coordinates of the vertices formed by the liquid, thus enabling the calculation of its volume.

The tests were carried out on the interdigitated capacitive sensors printed by screen printing, the substrate used was Polyethylene Terephthalate (PET), and the same material was used as a sensor encapsulation.

Typically, an aircraft tank is composed of aluminium or composite material, both having conductive properties. The influence of the conductive composite material, which would be connected to the earth/mass potential of the aircraft, implied integration of the sensor away from the carbon composite plate in an embodiment of the present disclosure. In this sense, a fibreglass composite layer (electrical insulation without earth/mass connection) was placed with a well-defined thickness.

Figure 15:
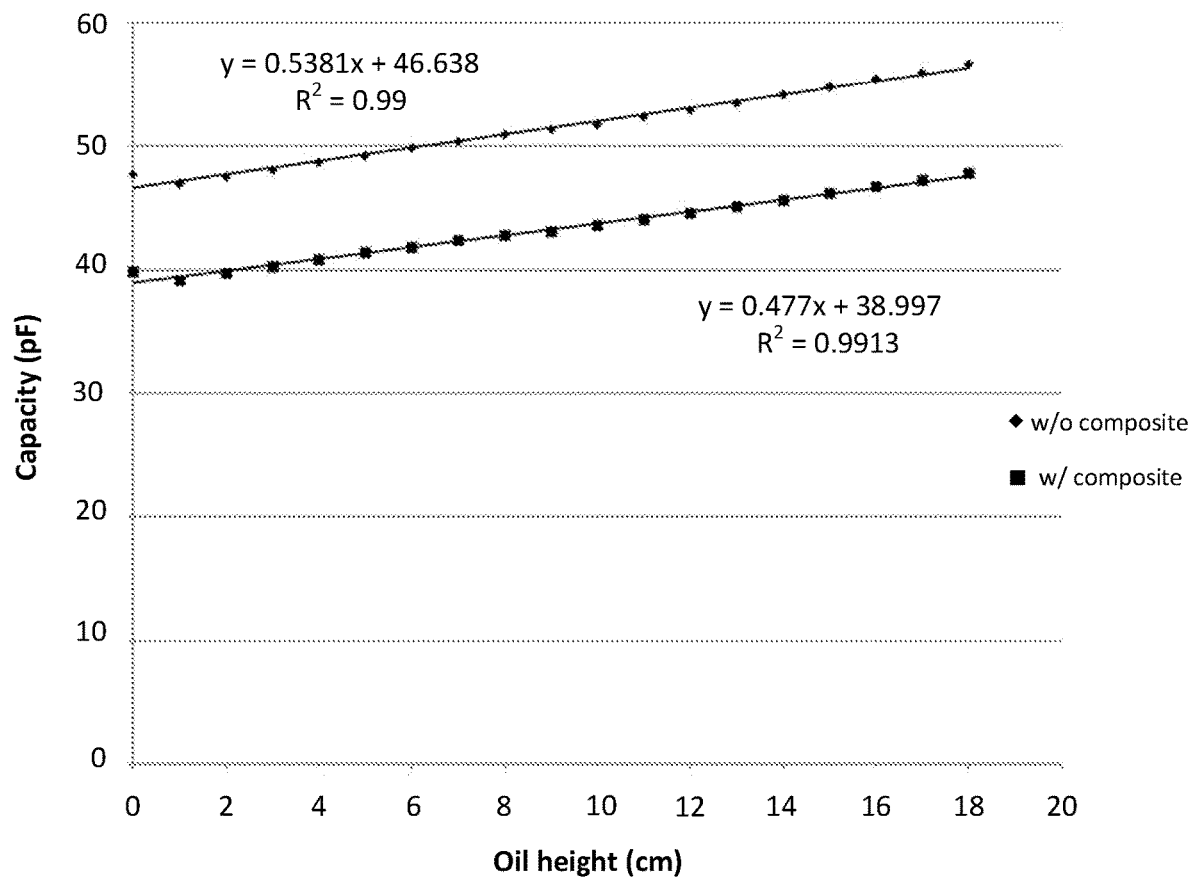
FIG. 15: Schematic representation of the capacity measured on the sensor installed on a fibreglass composite substrate, for different fuel levels with and without the carbon fibre composite (conductor) connected to the ground.

In an embodiment, the carbon fibre composite material with fibreglass composite layer is shown in the previous figure. Tests were carried out and as in this case the sensor would not be in contact with the carbon fibre composite, due to the existence of an insulating material layer of considerable thickness between the two, it was contemplated that there would be no interference in the capacitance measurements of the sensor. The results are shown in FIG. 15.

In an embodiment, the fibreglass intermediate layer between the conductive composite and the sensor allowed reducing the effect of the field produced by the conductive composite, having a reduction of about 16%, which, although superior to the reduction caused by other solutions studied at the electronic level, is enough to operate with the sensors. In addition the behaviour remains linear and it is concluded that it is not necessary, with the application of the fibreglass layer, to use more complex electronics.

In an embodiment, subsequently to being integrated into fibreglass and subsequent gluing of this layer to the carbon fibre composite, the sensors have been coated with a material suitable for coating fuel tanks for aircraft industry. Due to its oleophobic properties, it ensures that thin layers of fuel do not remain on the surface of the sensors. This coating has a contribution to the capacity of the sensor and subsequently to its sensitivity. Since the sensors have the same linear dependence with the fuel level, the calibration line was calculated and considered in the construction of the final system.

Figure 7:
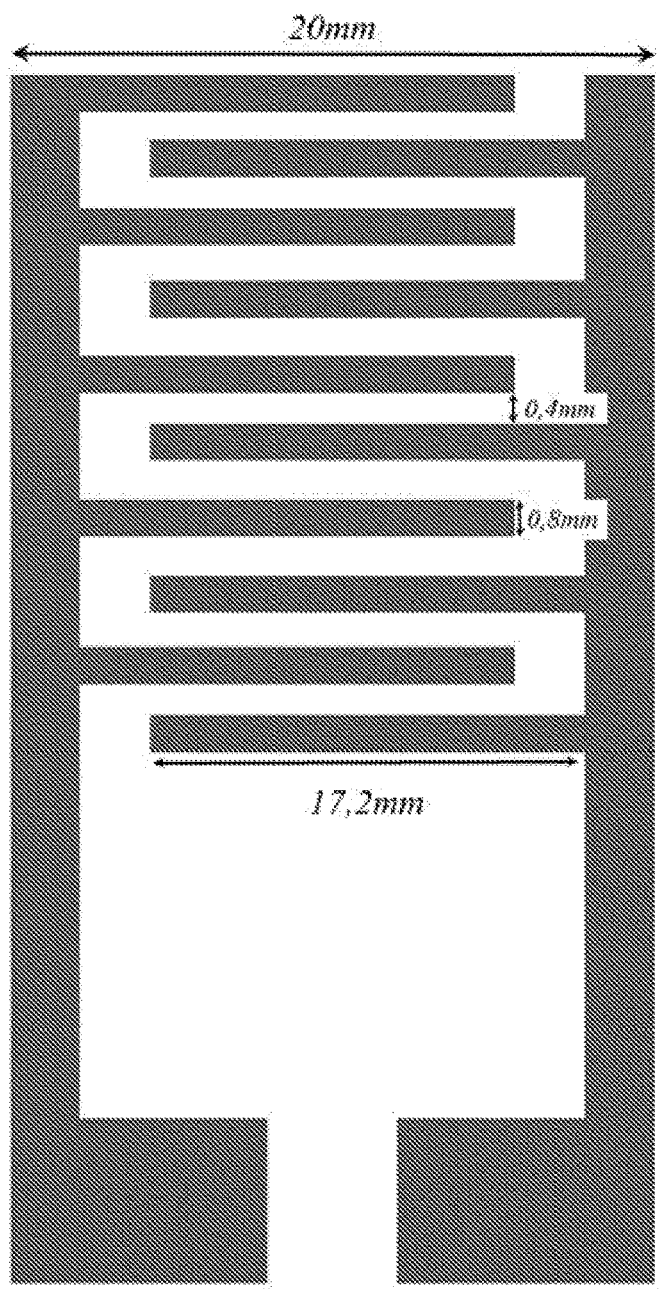
FIG. 7: Schematic representation of an embodiment of the final geometry of the interdigitated sensor.

In an embodiment, the sensor geometry was altered considering the following parameters: sensor width, distance between teeth, and length of teeth. In an embodiment, the geometry that presented adequate sensitivity, had a width of 10-40, in particular 15-30, further in particular 20 mm, in particular, depending on capacitive sensor design, with teeth length of 17.2 mm, teeth width of 0.8 mm and distance between teeth of 0.4 mm, which is represented in FIG. 7.

An embodiment includes the use of printed tracks for signal conduction in order to reduce the weight of the structure by removing signal conducting wires with their respective complex protection and radiation encapsulations. The first difficulty encountered was the fact that the signal conduction printed system, such as the tracks of the level sensors, is susceptible to electromagnetic interference creating parasitic currents. In fact, the protection of carbon composite printed structures for signal conduction requires the use of extra fibreglass layers with greater thickness, significantly increasing the weight of the entire composite final structure. In this sense, for a correct operation of the entire system, and remembering that there are several level sensors in the use of printed technology, for which the use of this type of composite structure using carbon fibre, provides a weight aggravation and increase of the cost of integration, going against one of the main functional objectives, that is, the reduction of weight throughout the structure. Thus, the use of conventional wiring in the use of composite structures using carbon fibre is preferred.

In an embodiment, due to possible exposure of the entire system to frequent currents and parasitic potential in the acquisition circuit, it was necessary to find a type of wiring containing an effective electromagnetic protection and that would simultaneously withstand 200° C., temperature at which the material must undergo through autoclaving process needed for the composition of the composite structure. Following these purposes, the polytetrafluoroethylene (PTFE) material, commercially recognized as Teflon®, was identified as an excellent high mechanical strength polymer ideal for the integration process, and also adaptable to the ranges of use, in the usual composite structure.

In an embodiment, the type of wiring may have a coaxial presentation composed of 4 layers of material. Inside it has a metallic material of high electric conductivity, followed by a PTFE layer, immediately followed by a metallic mesh also of high electrical conductivity and finally with a PTFE layer with greater thickness. In this way we have a high mechanical strength cable, being simultaneously ideal for use in high complexity systems subject to different electromagnetic environments.

In an embodiment, for each printed level sensor, it is necessary to use two cables, one for each electrode, wherein the cable shielding mesh should have the same potential as the acquisition system and the entire structure of the tank.

In an embodiment, the direct integration of a RTD (Resistance Temperature Detector) was used, for example a commercial RTD (PT-100) bulk, such as the platinum sensor SMD (surface mount device) provided by Innovative Sensor Technology—IST. The reference sensor P0K1.0805.3P.B is small (2×1.2×0.4 mm) in order to minimize the impact of direct integration. This sensor meets the operating specifications defined, namely the temperature range from −40° C. to +55° C.

Its integration into the composite structure is made close to the level sensors. In an embodiment, two RTD sensors should be positioned for temperature acquisition, one closer to the base of the tank and the other to be in an upper position. In order to facilitate the integration of the commercial RTD, it was welded to a small printed circuit board (PCB) where the connection and communication cables of the sensor were subsequently welded. It is later fully integrated into the composite structure.

In an embodiment the RTD sensor (PT-100) was integrated into the composite structure with 4 wires. Its connection to the data acquisition system is carried out using four wires, in order to guarantee a more accurate data acquisition, and to a support PCB, for a correct electrical connection of the sensor and its wires.

In an embodiment, an NFC device (or interchangeably, RFID) is integrated into the tank in order to identify the tank and receive some information thereon. After evaluating some NFC devices on the market, for example, Circus NFC devices were purchased, with a diameter of 25 mm and with adhesive substrate which allows an easy application and integration into the structure composed of fibreglass and composite. In an embodiment, since this device cannot be glued to a conductive surface, they were placed on a fibreglass layer which can subsequently be laminated in the tank.

Thus, the used, identified and specified NFC TAG devices need not have any type of preparation so that their integration would be as direct as possible in the composite structure with carbon fibre. In that sense, in an embodiment, conditions have been created for NFC TAG devices to operate, by creating a layer of fibreglass material on the carbon composite structure such as to create a sufficient distance to eliminate natural interference on the presence of a parasitic potential difference.

Figure 8A:
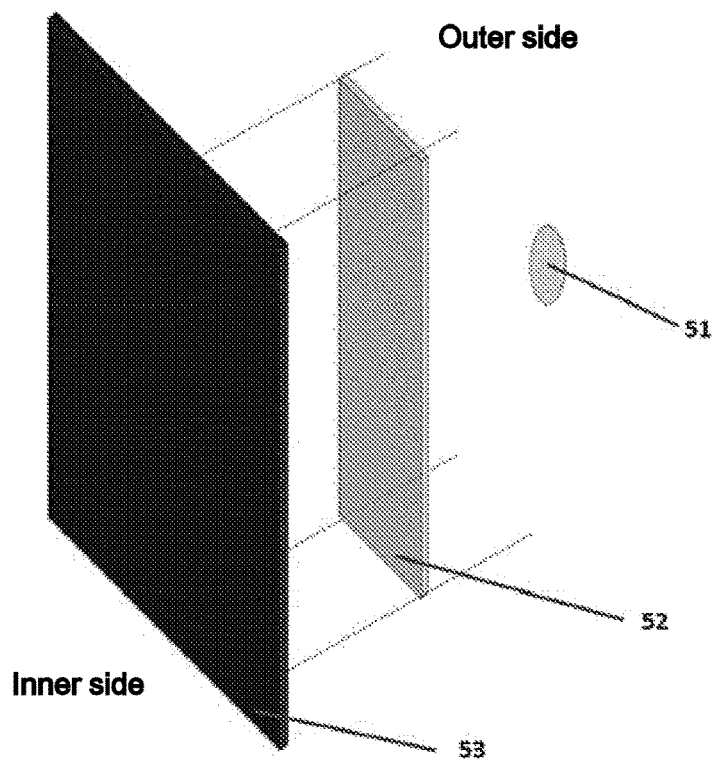
FIGS. 8A-B: Schematic representation of an embodiment of a NFC TAG integration scheme without ferrite shielding wherein 51 NFC TAG sensor, 52 represents fibreglass, and 53 represents carbon fibre composite structure.
Figure 8B:
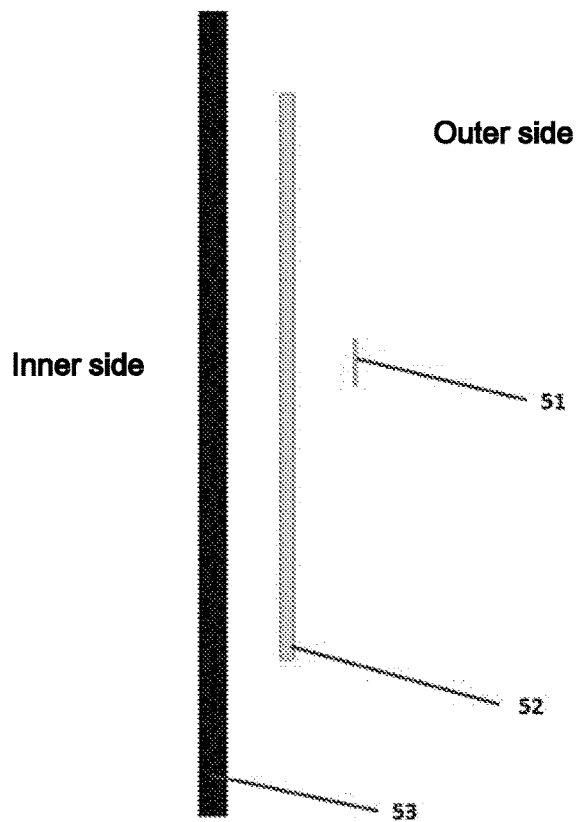

In an embodiment, a possible alternative to this system is the use of NFC TAGs properly prepared to be coupled to conductive surfaces. Not only do they allow for a more aesthetic solution, given the positioning of the device outside the tank, but also because the fibreglass layer increases the weight of the composite structure. An example of such systems are the NFC TAG devices with a shielding layer composed of ferrite between the antenna of the device and the adhesive layer. This allows a use of the NFC TAG device directly glued onto electrically conductive surfaces, as is the case of the carbon fibre composite structure. This eliminates the need to proceed with an integration process with the aid of fibreglass, which process can be observed in FIG. 8 (A-B). In the concrete case of the use of an NFC TAG device with shielding, the iterative and complex steps of integration are reduced, as well as the direct weight of the composite structure by reducing the use of material, namely the composite fibreglass.

In an embodiment, the selected device may be for example the 29 mm Round NTAG213 from RapidNFC, with an adhesive layer allowing rapid and immediate integration, subsequently glued with specific adhesive, so as to provide adequate physical protection on the outer and conductive surface of the tank.

In an embodiment, the developed data acquisition and transmission board has different alternatives. The first one was composed of an electronic circuit with the incorporation of passive components, such as resistors and capacitors, and active components (microcontroller PIC16LF1829), the IC for capacity measurement (e.g. AD7746), the IC for temperature measurement (e.g. MAX31865), the voltage regulator (MIC5236), an operational amplifier and still a transceiver for communication, e.g. via RS485.

In an embodiment, the microcontroller used for the design of this acquisition board was for example PIC16LF1829. This IC has the function of collecting data from the measurement integrators, using communication for example via I2C to acquire the respective capacity values, and communication for example via SPI to obtain the temperature values. Subsequently to this acquisition, this IC performs the processing of this data and assumes the Slave position. In this sense, depending on the commands coming from the Master, the processed data is sent through a bus, for example RS485, using a transceiver to perform this information transmission. In an embodiment, the measurement of capacitance from the level sensors undergoes an assembly combining an operational amplifier and the IC AD7746.

In an embodiment, the AD7746 IC is a CDC (Capacitance-to-Digital-Converter) capable of performing capacitance measurements in a range of 8 pF, that is, it can measure and convert capacitances whose variation is ±4 pF, considering a reference up to 17 pF. However, due to the need to measure capacity values greater than those mentioned, for example, an operational amplifier was added to increase the range of values accepted by AD7746. In this sense, joining these two components can carry out the desired measurements in the system to be developed.

In an embodiment, for the temperature measurement, MAX31865 was used for example to measure the variation of the resistance resulting from the PT100. This IC has the ability to convert this variation directly into a digital value corresponding to a temperature, thus eliminating the need to add extra circuits.

At the feed level of the board, in order to be able to incorporate this electronic board into the final system, in an embodiment it was also necessary to incorporate a regulator which converts the feed voltage normally used in aeronautical systems (28 V) to the power voltage used by all the mentioned components (3.3 V).

In an embodiment the board allows cable connections with shielding in order to minimize external interference, both in the reading of the sensors and in communication.

In an embodiment, after assembling all boards, they were fixed inside housings of for example ABS (acrylonitrile-butadiene-styrene), and the integration of these acquisition modules was then undertaken. Finally, two buses were created, one for power supply (VDD and GND) and the other for communication, e.g. RS485 (A and B), using flexible cables to simplify positioning and gluing of the modules in the tank.

Given all the electronic complexity associated with the data acquisition modules, and their operation near limit values for the interior of the tank, it was easier to plan the positioning of the modules on the outer faces. For this, in an embodiment the data acquisition modules are protected from external environments by the use of a plastic housing constituted by ABS polymer coated with an aluminium or copper self-adhesive layer connected to the composite material in order to create a physical barrier to external elements.

In an embodiment, in addition to the housing, all hardware contained in the ABS housing is encapsulated by an epoxy resin, preferably Flame Retardant, which must be placed during the process of integrating all hardware.

In an embodiment, the fibreglass laminate, a connection component between the sensor and the carbon fibre composite component, used in level and temperature sensors, represents an inorganic compound with high-stress and humidity strength, since it does not alter its physical and/or chemical properties, also representing an electric insulator of low dielectric constant with low thermal expansion coefficient.

In an embodiment, in order to allow the integration of the various sensors in the composite components, adhesives were used, namely adhesives in the form of liquid and film adhesives. In the composite components tested, a structural adhesive film was used and in the connections between components a liquid adhesive was used. Due to the nature of the fuel, the application of treatment to the inner surfaces of the tank is required in order to safeguard the structural strength of the constituent components of the tank. Thus, in an embodiment, 3 types of surface treatments are considered, namely primer application, coating and sealing of the structure using an adhesive sealant.

The use of a primer and coating is related to the need to protect the internal surfaces of the corrosive environment in which they are inserted. The sealing of the tank is essential in order to guarantee the functionality of the structure.

TABLE 1

Design of laminate for integrated sensors.

| Component | Lamination Sequence | Material | Fibre direction | Observations |
|---|---|---|---|---|
| Integrated sensors (Fibreglass laminate) | 01 | Prepreg - fibreglass, 1.5-5 mm thick | [0/90°; 0/90°; 0/90°; 0/90°; 0/90°] | First layer in contact with the mould surface |
| | 02 | Sensor | 0° | Component composed of substrate printed grid |
| | 03 | Adhesive Film | N/A | 1 layer |

The laminate design used for the fibreglass composite component is shown in Table 1.

Figure 9:
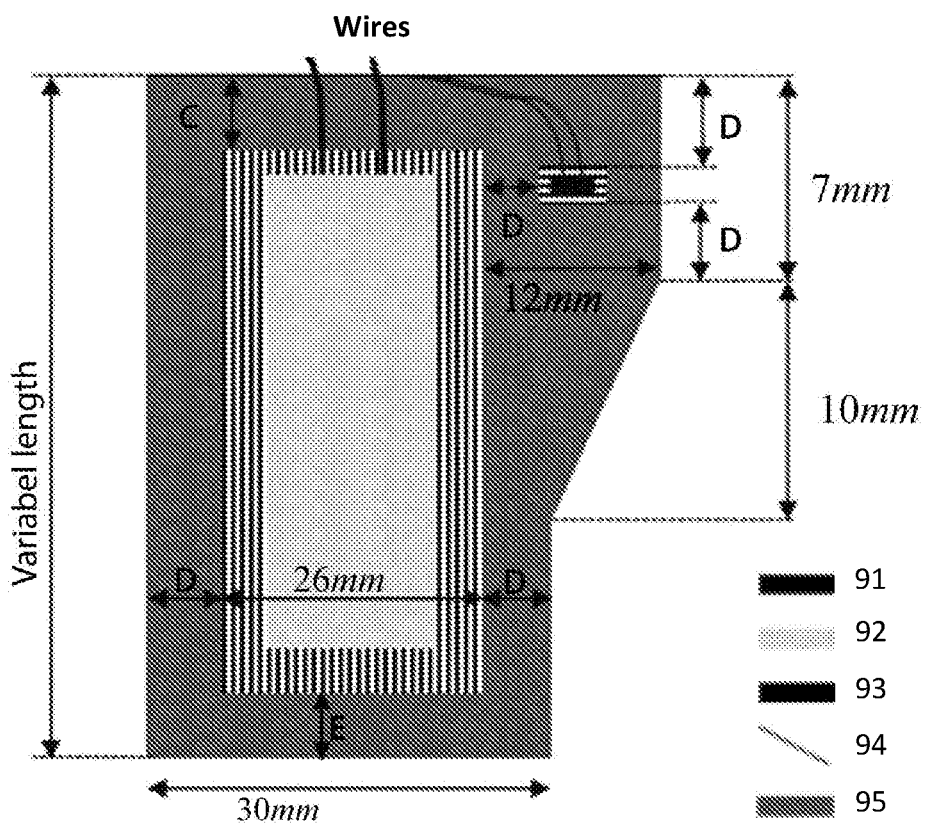
FIG. 9: Schematic representation of an embodiment of the level and temperature sensor arrangement wherein 91 represents sensor (level, temperature), 92 represents PET substrate of the level sensor, 93 represents fibreglass laminate, 94 represents sensor cable and 95 represents carbon fibre composite component. C=1 mm (reference); D=2 mm.

In an embodiment, the orientation of the fibreglass laminate comprises the alignment of the fibres at 0° with the longitudinal length (top dimension) of the fibreglass laminate of FIG. 9 for the level sensor, as detailed in the diagram. For the fibreglass laminate present in the temperature sensor the direction of the fibre alignment to be applied is detailed in FIG. 9.

In order to facilitate the integration of the various sensors into the composite components of the tank structure, the integration of the temperature and level sensors into the same fibreglass laminate was determined, thus reducing possible failure caused during the production process.

In an embodiment, relating to carbon fibre components the design of the laminate is not shown taking into account that it depends on the specifications of the tank structure. For example, a monolithic structure of several layers, comprising several carbon fibre orientations for the integral components of the tank is considered.

As described in the previous section, the production process comprises the manufacture of the level sensors printed on the PET substrate, in a first stage, as well as, simultaneously, the production process of the carbon fibre composite components constituting the final structure. In a second stage, the sensors integrated in fibreglass are produced, specifically, level sensors and temperature sensors.

After all constituents are produced, the components are assembled, comprising the process of integrating the sensors integrated in fibreglass into the constituent components of the tank. Due to the specificity in the operability of the sensors, the final stage of the production process comprises the treatment of the internal surfaces where there is contact with the liquid, i.e. the fuel. As described, the production process comprises 4 steps, however the production of the composite components, namely prepreg composed of carbon fibres and fibreglass, respectively, components of the tank structure and integrated sensors, will now be addressed. The constituent components of the tank structure are composed predominantly of carbon fibre prepreg cured using autoclave.

The production of fibreglass integrated sensors comprises the autoclave lamination adopting a process similar to the carbon fibre components. The lamination and curing of the integrated sensors were done using complex U-shaped surface moulds.

The integration of the various sensors into the respective laminates is ensured through the use of epoxy in the prepregs for temperature and level sensors. As far as the NFC TAG is concerned, the joining is guaranteed through the use of the adhesive in the sensor itself and the use of the additional adhesive is foreseen, if necessary.

Figure 10:
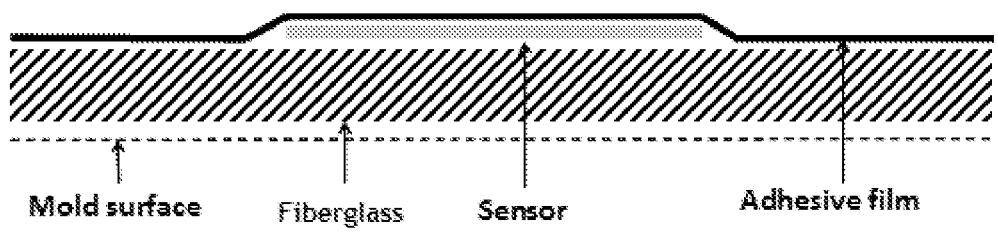
FIG. 10: Schematic representation of an embodiment of the integration schematic of the sensor integrated in the fibreglass.

The integration of the sensors comprises the joint lamination between sensor (level and temperature) and fibreglass prepreg proceeding with the subsequent gluing in the composite, according to FIG. 10.

Integration using adhesive between fibreglass integrated sensor and tank component is performed between the rough surface of the carbon fibre laminate and the surface of the integrated sensor mould in order to ensure adherence between surfaces.

As detailed in the schematic of the integrated sensor design, the wiring location comprises its alignment with the end part of the fibreglass laminate. Due to the various layers of the coating of the wiring used, its stripping is preferred in order to avoid fraying the area and hence the connectors of the printed grid.

Figure 11:
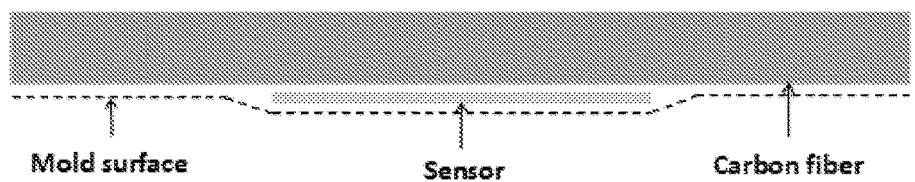
FIG. 11: Schematic representation of an embodiment of NFC TAG integration schematization

The described procedure is applied to the level and temperature sensors. However and considering the specificity of the NFC TAG, the application of the sensor with an approximate diameter of 3 mm is carried out directly on the carbon fibre composite component of the tank. In this way, the application should be performed in order to comprise the schematization in FIG. 11.

Integration of the NFC TAG into the carbon fibre component is ensured through the adhesive present on the sensor itself, however, and if necessary, additional adhesive may be applied.

The lamination process comprises the following steps: cutting the prepegs, manual lamination of the layers on the mould, compaction, curing preparation procedure, pre-testing and curing tests.

The application of the various surface treatments comprises constant monitoring of working conditions, namely temperature and humidity control. In this way all procedures to be applied to the components composing the tank should preferably be carried out between 13° C. and 35° C. with a relative humidity of 20% to 85%.

Subsequently to tests with various designs of sensors where different surface treatments were tried, the design to be used in the specific environment, which is a fuel tank, was determined. In this way the need to protect the constituent components of the tank with primer and coating in which sensors are subjected exclusively to coating application was determined.

The surface coating application of the integrated sensors comprises the following stages. 1. Preparation of the surface for application: cleaning using a clean cloth soaked in solvent. 2. Preparation of the component to be applied (coating). 3. Application of the mixture: shaking to ensure that there is no solidification on the bottom of the vessel; applying the mixture preferably up to 24 hours after cleaning the surface prepared in the previous points; application, preferably of 1 to 2 layers, as required to ensure homogeneous and continuous application of the mixture. 4. Complying with mixture curing times.

After application of the coating, the sealant is applied. The described procedure is performed after assembly curing for the previous process.

Sealing comprises the application in the interface areas as well as in the limits relating to parts/component joints. In this way, the limit of the sensors integrated in fibreglass when integrated in the carbon fibre component must be sealed in order to guarantee a uniform and continuous "cord" of sealant. In order to ensure correct sealing of components, the components and equipment must be free from contaminants (e.g. dust) and the component must be completely immobilized until the end of the curing process.

After the application process of either coating or sealant, visual inspection is required in order to ensure compliance with the specifications.

Due to the use of several materials with different thermal expansion coefficients, bending has been observed, this being considered a criterion of conformity of the component, since the excessive curvature hinders the gluing between fibreglass and carbon fibre composite plates. Cable insulation shall comprise curing temperatures in order to avoid damage resulting from handling or from high temperatures. After integration of the sensors, the movement of the cables should be restricted, for example, by the application of an adhesive. The sensors shall be visually inspected and tested in order to determine their correct functionality prior to the surface treatment application procedure.

Considering the objective of integrating sensors into composite fuel tanks, the developed integration process comprises the use of level and temperature sensors integrated into a fibreglass plate, later integrated into the carbon fibre composite. Adopting the present method of integration of the sensors in 2 stages arises from studies and experiments carried out wherein the deformation of the carbon fibre composite was verified when sensors are integrated directly.

Figure 12:
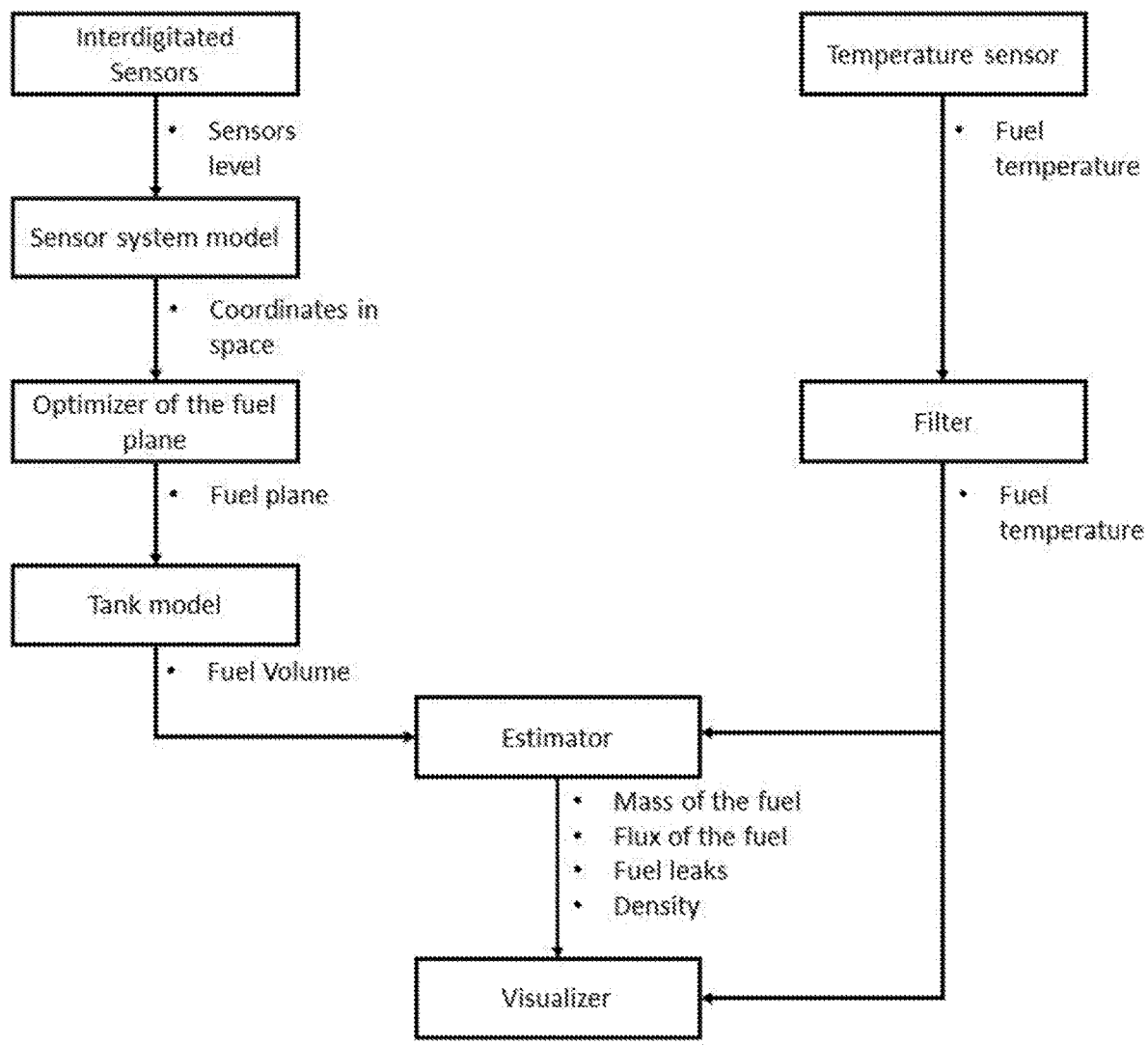
FIG. 12: Schematic representation of a data flow embodiment.

With the software developed it is intended to acquire and convert the information from the sensors installed in the most appropriate engineering units. For this, software was developed following the architecture presented in FIG. 12.

In the developed application, data originates from the sensors, then goes through several processing modules, until they are transformed into information in the most appropriate engineering units, the results being presented on a display (GUI).

Capacitive interdigitated sensors have the function of measuring the fuel level at various fuel tank orientations/positions. The measured values allow, after processing, calculating the fuel volume.

The temperature sensors allow acquiring the temperature of the fuel that is used for calculating the total density and mass thereof. This information is important, since the volume and dielectric constant of the fuel itself vary with temperature.

In this model the information from the interdigitated sensors gives a percentage indication of the area of the sensor covered by fuel.

It is also in this module where information from the interdigitated sensors is transformed into coordinate points of the fuel surface, this being the input of the fuel plane optimizer module. The model of the sensor system requires the information on the position of the sensors within the fuel tank, as well as the connection between sensors (e.g. sensors at one of the vertices or sensor extension).

In actual measuring systems, four or more points belonging to the same plane, that is, coplanar, will not be normally obtained, due to the sloshing phenomenon and errors in the measurements of the sensors. It is therefore necessary to adopt a strategy to obtain an estimated plane. The fuel plane optimizer module has the main function to process the coordinates of four or more points and generate an optimized plane that best represents the coordinates of the points. The cutting plane generated by this module shall be used by the tank model module to estimate the liquid volume within.

Figure 13:
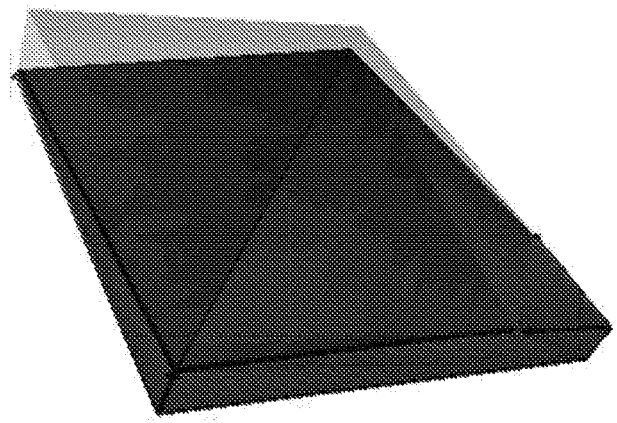
FIG. 13: Schematic representation of a fuel tank embodiment wherein the dark spot represents the geometry of the fuel volume present in the tank.

This module requires information about the geometry of the tank. The geometry of the tank is loaded from a file, for example in XML format, which contains information about the tank faces. This module, through the tank model and the resulting plane, generates a solid with the geometry of the tank filled with fuel, followed by the calculation of the volume thereof. In FIG. 13, the solid equivalent to the part corresponding to the fuel is defined with a darker colour.

After collecting all geometric information from the volume occupied by the fuel, it is necessary to estimate its value, taking into account the sources of noise introduced throughout the process. In the estimator module the fuel volume is converted to mass; the mass of fuel is estimated by applying data processing techniques and fuel leakages are detected and quantified.

The volume is converted into mass to obtain an invariant magnitude with the temperature, used in the aeronautical sector the fuel, since this is a more accurate measurement than the volume. Normally, in order to carry out this conversion the density, given by the temperature of the fuel at a given moment, is necessary.

For data filtering, two types of filters were implemented: the Kalman filter and the mobile average filter.

The mobile average filter was implemented with the weight of one for each sample. The number of samples is a filter configuration parameter.

$$\bar{x}_k = \frac{\sum_{1}^{n} x_{k-n}}{n}$$

The Kalman filter was implemented using a first-order dynamic system in which the control variable ($\mu k$) is fuel flow and the state variable (xk) is the mass of the fuel. The output of the system is zk, wk and Vk are the mass flow measurement and the mass measurement variance in the fuel.

$$x_{k+1} = x_k + \Delta t \times \mu_k + w_k z_k = x_k + V_k$$

Figure 14:
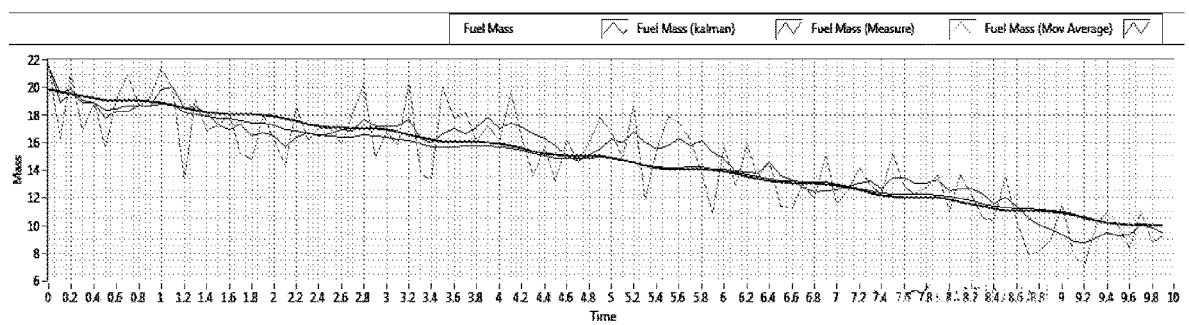
FIG. 14: Schematic representation of an embodiment of the fuel mass filtering.

FIG. 14 shows a graph with curves of an example of the two filters as well as the mass before filtering.

Leaks are calculated based on the difference in the sum of the fuel flow time to the tank outlet by the mass difference at an initial state and the current mass estimated by the sensors installed in the fuel tank.

$$\text{Leaks} = (\text{Mass}_{t0} - \text{Mass}_{m}) - \Sigma_{t0}^{m} \text{Flow} \cdot dt)$$

By applying the Kalman filter it is possible to improve fuel level monitoring when compared to the mobile average method. However, information about fuel consumption is required.

Although the present disclosure has only shown and described particular embodiments thereof, one skilled in the art shall know how to introduce modifications and replace some technical features for equivalents, depending on the requirements of each situation, without departing from the scope of protection defined by the appended claims.

The embodiments presented are combinable. The following claims set out particular embodiments of the disclosure.

The term "comprises" or "comprising" when used herein indicates the presence of mentioned features, elements, integers, steps and components, but does not preclude the presence or addition of one or more features, elements, integers, steps and components, or groups thereof.

The embodiments described are combinable.

The present invention is of course in no way restricted to the embodiments herein described and a person of ordinary skill in the art will be able to provide many modification possibilities thereto and substitutions of technical features for equivalents, according to requirements in each situation, as defined in the claims.

The following claims set out particular embodiments of the disclosure.

The invention claimed is:

1. A liquid fuel tank having a fuel tank bottom and side walls, comprising:
    a plurality of liquid level detection capacitive sensors, each arranged along an edge of the fuel tank such that the capacitance of said sensors varies with the volume of fuel present in the fuel tank,
    wherein an independent liquid level detection capacitive sensor is arranged along each edge of the fuel tank bottom and of the side walls,
    wherein the fuel tank is electrically conductive and each liquid level detection capacitive sensor comprises an electrically insulating plate each arranged thickness-wise between each capacitive sensor and the fuel tank, the thickness of said plate being such that the fuel tank and the capacitive sensors are capacitively uncoupled for liquid level detection, and
    wherein said plate is at least 1.5 mm thick.

2. The fuel tank according to claim 1, wherein each liquid level detection capacitive sensor is independent of the other liquid level capacitive sensors.

3. The fuel tank according to claim 1, wherein the capacitive sensors are embedded in the respective electrically insulating plate, the thickness of said plate, between the embedded sensor and the fuel tank, being such that the fuel tank and the capacitive sensors are capacitively uncoupled for liquid level detection.

4. The fuel tank according to claim 1, wherein the insulating plates are embedded into the fuel tank and wherein the fuel tank is of a composite material.

5. The fuel tank according to claim 1, wherein the insulating plates comprise a fibre composite.

6. The fuel tank according to claim 1, wherein the capacitive sensors comprise interdigitated electrodes.

7. The fuel tank according to claim 1, wherein the capacitive sensors are encapsulated between two polyethylene terephthalate sheets.

8. The fuel tank according to claim 1, further comprising one or more temperature sensors for calibrating a mass measurement of the fuel present in the fuel tank, each temperature sensor further comprising an electrically insulating plate for supporting each temperature sensor in the fuel tank.

9. The fuel tank according to claim 8, wherein each said electrically insulating plate having a temperature sensor also has a capacitive sensor.

10. The fuel tank according to claim 1, wherein each capacitive sensor comprises two interdigitated electrodes.

11. The fuel tank according to claim 1, further comprising one or more NFC devices for individual identification and/or storage of fuel tank individual data,
    wherein respective electrically insulating plates support each said NFC device in the fuel tank.

12. The fuel tank according to claim 1, further comprising an additional sealant layer as inner coating for insulating the capacitive sensors from the tank interior.

13. The fuel tank according to claim 1, wherein the capacitive sensors are further coated by an oleophobic layer for contacting the fuel of the tank.

14. A method for obtaining the fuel volume of a fuel tank of the type having a fuel tank bottom and side walls, the fuel tank comprising a plurality of liquid level detection capacitive sensors positioned so that the capacitance of said sensors varies with the volume of fuel present in the fuel tank, wherein the liquid level detection capacitive sensors are arranged along each edge of the fuel tank bottom and of the side walls, wherein the fuel tank is electrically conductive and each liquid level detection capacitive sensor comprises an electrically insulating plate each arranged thickness-wise between each capacitive sensor and the fuel tank, the thickness of said plate being such that the fuel tank and the capacitive sensors are capacitively uncoupled for liquid level detection, the method comprising the steps of:
    obtaining the reading of liquid level detection capacitive sensors arranged on edges of the fuel tank; and
    computing the volume, corresponding to the fuel, of the geometric solid defined by the fuel tank and by the upper surface of the fuel as defined by the liquid level readings from the capacitive sensors on the edges of the tank.

15. The method according to claim 14, wherein computing the volume of the geometric solid comprises:
    decomposing the volume of said geometric solid corresponding to the fuel into pyramidal volumes; and
    summing the volume of said pyramids.

16. The method according to claim 14, further comprising:
    if the liquid level readings from the capacitive sensors diverge in the definition of the upper surface of the fuel, then
    estimating the upper surface of the fuel by computing the upper surface which minimizes error in relation to the divergent liquid level readings of the capacitive sensors.

17. The method according to claim 14, further comprising:
    if it is determined, from the readings of the capacitive sensors of the fuel tank, that at least one capacitive sensor is fully submerged, then calibrating the capacitive sensors based on the capacitance measurement of the capacitive sensor or sensors which are totally submerged.

18. The method according to claim 14, further comprising:
  additionally obtaining readings of tilt and rolling angle data of the fuel tank; and
  computing the volume of the geometric solid corresponding to the fuel from the readings of the capacitive sensors and from the tilt and rolling angle data of the fuel tank.

19. The method according to claim 18, further comprising:
  if it is determined, from the tilt and rolling angle data of the fuel tank, that at least one capacitive sensor is fully submerged, then calibrating the capacitive sensors based on the capacitance measurement of the capacitive sensor or sensors which are totally submerged.

20. The method according to claim 18, further comprising:
  if it is determined, from the readings of the capacitive sensors of the fuel tank, or from the tilt and rolling data of the fuel tank, that at least one capacitive sensor is totally submerged, then gauging the dielectric constant of the fuel present in the fuel tank based on the capacitance measurement of the capacitive sensor or sensors that are fully submerged.

* * * * *